(12) United States Patent
Damen

(10) Patent No.: US 9,590,549 B2
(45) Date of Patent: Mar. 7, 2017

(54) TORQUE CONTROL FOR A WIND TURBINE GENERATOR IN CASE OF FAULT

(71) Applicant: XEMC Darwind B.V., Hilversum (NL)

(72) Inventor: Michiel Eduard Cornelis Damen, The Hague (NL)

(73) Assignee: XEMC DARWIND B.V., Hilversum (NL)

( * ) Notice: Subject to any disclaimer, the term of this patent is extended or adjusted under 35 U.S.C. 154(b) by 0 days.

(21) Appl. No.: 14/378,024

(22) PCT Filed: Feb. 14, 2013

(86) PCT No.: PCT/EP2013/053016
§ 371 (c)(1),
(2) Date: Aug. 11, 2014

(87) PCT Pub. No.: WO2013/120967
PCT Pub. Date: Aug. 22, 2013

(65) Prior Publication Data
US 2015/0008673 A1    Jan. 8, 2015

(30) Foreign Application Priority Data

Feb. 14, 2012   (EP) ..................................... 12155455

(51) Int. Cl.
*F03D 9/00* (2016.01)
*H02P 9/04* (2006.01)
(Continued)

(52) U.S. Cl.
CPC .............. *H02P 9/04* (2013.01); *F03D 7/0264* (2013.01); *F03D 7/0272* (2013.01);
(Continued)

(58) Field of Classification Search
CPC ........ H02P 9/04; F03D 7/0264; F03D 7/0272; F03D 7/0288
(Continued)

(56) References Cited

U.S. PATENT DOCUMENTS

RE43,698 E    10/2012   Hudson
8,478,448 B2   7/2013   Krueger
(Continued)

FOREIGN PATENT DOCUMENTS

CN    101604953 A    12/2009
CN    101999040 A     3/2011
(Continued)

OTHER PUBLICATIONS

International Search Report and Written Opinion mailed May 24, 2013 for corresponding International Application No. PCT/EP2013/053016, filed on Feb. 14, 2013.
(Continued)

*Primary Examiner* — Tulsidas C Patel
*Assistant Examiner* — Thomas Quigley
(74) *Attorney, Agent, or Firm* — Steven M. Koehler; Westman, Champlin & Koehler, P.A.

(57) ABSTRACT

A method and controller for controlling the torque in a wind turbine is described wherein the wind turbine is configured to deliver power via a converter to a public grid. The method comprises the steps of: receiving a fault signal; and, in response to said fault signal, a converter controller controllably ramping down the torque of said turbine from a nominal torque value to a predetermined low torque value within a predetermined time window selected from 0.2-2 seconds, preferably 0.5-1.5 seconds.

17 Claims, 5 Drawing Sheets

(51) Int. Cl.
*F03D 7/02* (2006.01)
*H02P 29/04* (2006.01)
*H02P 9/10* (2006.01)

(52) U.S. Cl.
CPC ............ *F03D 7/0288* (2013.01); *H02P 9/102* (2013.01); *H02P 29/04* (2013.01); *Y02E 10/723* (2013.01)

(58) Field of Classification Search
USPC ....................................................... 290/44, 55
See application file for complete search history.

(56) References Cited

U.S. PATENT DOCUMENTS 8,686,581 B2 * 4/2014 Harms .................. F03D 7/0284
290/44

| | | | |
|---|---|---|---|
| 2006/0034357 A1 | 2/2006 | Yippo et al. | |
| 2007/0052244 A1 | 3/2007 | Hudson | |
| 2010/0283247 A1 | 11/2010 | Krueger | |

FOREIGN PATENT DOCUMENTS

| | | |
|---|---|---|
| CN | 102055405 A1 | 5/2011 |
| DE | 10105892 A1 | 9/2002 |
| EP | 1626492 A2 | 2/2006 |
| EP | 2405134 A1 | 1/2012 |
| WO | 2004098261 A2 | 11/2004 |
| WO | 2012003970 A1 | 1/2012 |

OTHER PUBLICATIONS

Chinese Office Action for Chinese patent application No. 201380009557.5, dated Apr. 28, 2016.

* cited by examiner

TORQUE CONTROL FOR A WIND TURBINE GENERATOR IN CASE OF FAULT

CROSS-REFERENCE TO RELATED APPLICATION

This application is a Section 371 National Stage Application of International Application PCT/EP2013/053016 filed Feb. 14, 2013 and published as WO2013/120967 A1 in English.

Aspects of the invention relates to torque control for a wind turbine generator and, in particular, though not exclusively, to a method for controlling the torque of a wind turbine generator, a torque controller for a wind turbine generator, a wind turbine comprising such torque controller and a computer program product using such method.

BACKGROUND

The discussion below is merely provided for general background information and is not intended to be used as an aid in determining the scope of the claimed subject matter.

Wind turbine technology is a rapidly developing field of technology. The installation and operation of a wind park and the connection of such a wind park to the public grid however provides some technological challenges. Wind turbines may be installed in areas wherein the grid is not very stable, so that the control system of the wind farm and/or the control system in each wind turbine of the wind farm should be able to take measures when so-called grid faults or faults occur during operation. Here, a fault may be defined as a utility disturbance that results in the voltage on the utility transmission system (e.g. the public grid) to drop by a significant amount for a short duration (typically less than 500 ms). Faults may be caused by ground connections and short circuits and often appear during lighting and storms. A significant voltage drop may also appear due to a large change in the load in the utility transmission system.

Conventionally, a turbine may be protected against such grid faults using a fault protection circuit. When a fault is detected, the fault detection circuit may for example dump the excess power generated by the turbine during the fault into a number of resistor banks. Once the resistor banks are overloaded, the power and associated torque are reduced to zero in a couple of milliseconds. A similar situation may occur when an emergency stop in a wind turbine is triggered. Such emergency stop may e.g. be triggered if a particular turbine element is defect. Also in that case, the torque of the wind turbine is reduced to zero within milliseconds.

A sudden decrease of the wind turbine torque exposes the turbine and the tower to severe mechanical stress. Especially in areas wherein grid faults occur frequently, the effects of frequent torque shut downs may eventually have detrimental mechanical effects to the wind turbine structure.

Hence, there is a need in the prior art for improved torque control during grid faults and emergency stops. In particular, there is a need for torque control, which mitigates the problems related to the exposure of the wind turbine to heavy mechanical loads.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background An aspect of the invention to reduce or eliminate at least one of the drawbacks known in the prior art and to provide in a first aspect of the invention to a method for controlling the torque of a wind turbine generator, wherein said may comprise: receiving a fault signal; and, in response to said fault signal, controllably ramping down the torque of said generator from a first torque value to a predetermined second torque value within a predetermined time period between 0.01 and 10 seconds, preferably between 0.5 and 1.5 seconds. In an embodiment the torque of said generator may be ramped down on the basis of one or more torque reference values. These calculated or pre-determined reference values may define a desired torque response to a fault signal, wherein the torque reference values are determined such that the mechanical stress on the wind turbine structure during the fault is minimal.

In another embodiment said torque ramping down may further comprise: determining an actual torque value of said generator; comparing said actual torque value with at least one of said reference torque values; if said actual torque value deviates from said reference torque value, controlling said actual torque value to said reference torque value. Hence, a direct torque control method may be used in order to allow fast torque responses to detected fault signals.

In yet another embodiment, said method may comprise: during said torque ramp down releasing at least part of the power stored in the converter to one or more brake resistors. This way, during the fast ramp-down, access energy may be efficiently released thereby decreasing the chance of damage.

In a further embodiment, said method may comprise: detecting an end of fault signal; in response to said end of fault signal, stopping said torque ramping down if said second torque value has been reached; and, ramping up said torque to said first torque value, preferably within a predetermined time period between 0.01 and 10 seconds, preferably between 0.5 and 1.5 seconds. Hence, after the fault, the torque may be efficiently ramped up in such as way that the wind turbine structure is exposed to minimal mechanical stress.

In yet a further embodiment said first torque value represents a normal operation torque value and wherein said second torque value represents a low torque value which is approximately between 0 and 50%, preferably between 20% and 40%, of said normal operation torque value. An aspect of the invention, thus not only allows torque control during a low-voltage ride-through but when an emergency stop requires the wind turbine to be set to a zero torque state in a very short time.

In one variant said fault signal may be generated by said converter controller in response to the detection of a grid fault comprising a decrease from a nominal grid voltage value to a low grid voltage value or wherein said fault signal is generated by a wind turbine controller in response of the detection of a failure of at least part of an element of said wind turbine or an emergency stop.

In a further aspect, the invention may relate to a torque controller for controlling the torque in a wind turbine wherein said torque controller is configured to receive a fault signal; and, in response to said fault signal, to controllably ramp-down the torque of said generator from a first torque value to a predetermined second torque value within a predetermined time period between 0.01 and 10 seconds, preferably between 0.5 and 1.5 seconds.

In an embodiment the torque of said generator may be ramped down on the basis of one or more reference torque values, preferably said torque controller being configured to: determine an actual torque value of said generator; comparing said actual torque value with at least one of said reference torque values; and, if said actual torque value deviates from said reference torque value, control said actual torque value to said reference torque value.

In another embodiment, said torque controller may be further configured to: detect an end of fault signal; in response to said end of fault signal, to stop said torque ramping down if said second torque value has been reached; and, to ramp-up said torque to said first torque value, preferably within a predetermined time period between 0.01 and 10 seconds, preferably between 0.5 and 1.5 seconds.

In one embodiment said first torque value may represent a normal operation torque value and said second torque value may represent a low torque value which is approximately between 0 and 50%, preferably between 20% and 40%, of said normal operation torque value.

In yet a further aspect, the invention may relate to a wind turbine comprising a torque as described above.

In one embodiment, said wind turbine may comprise a brake chopper for releasing at least part of the power stored in the converter to one or more brake resistors.

The invention also relates to a computer program product comprising software code portions configured for, when run in the memory of computer or a controller such as wind farm controller or a wind turbine controller, executing at least one of the method steps as described above.

Aspects of the invention will be further illustrated with reference to the attached drawings, which schematically will show embodiments according to the invention. It will be understood that the invention is not in any way restricted to these specific embodiments.

DETAILED DESCRIPTION

Figure 1:
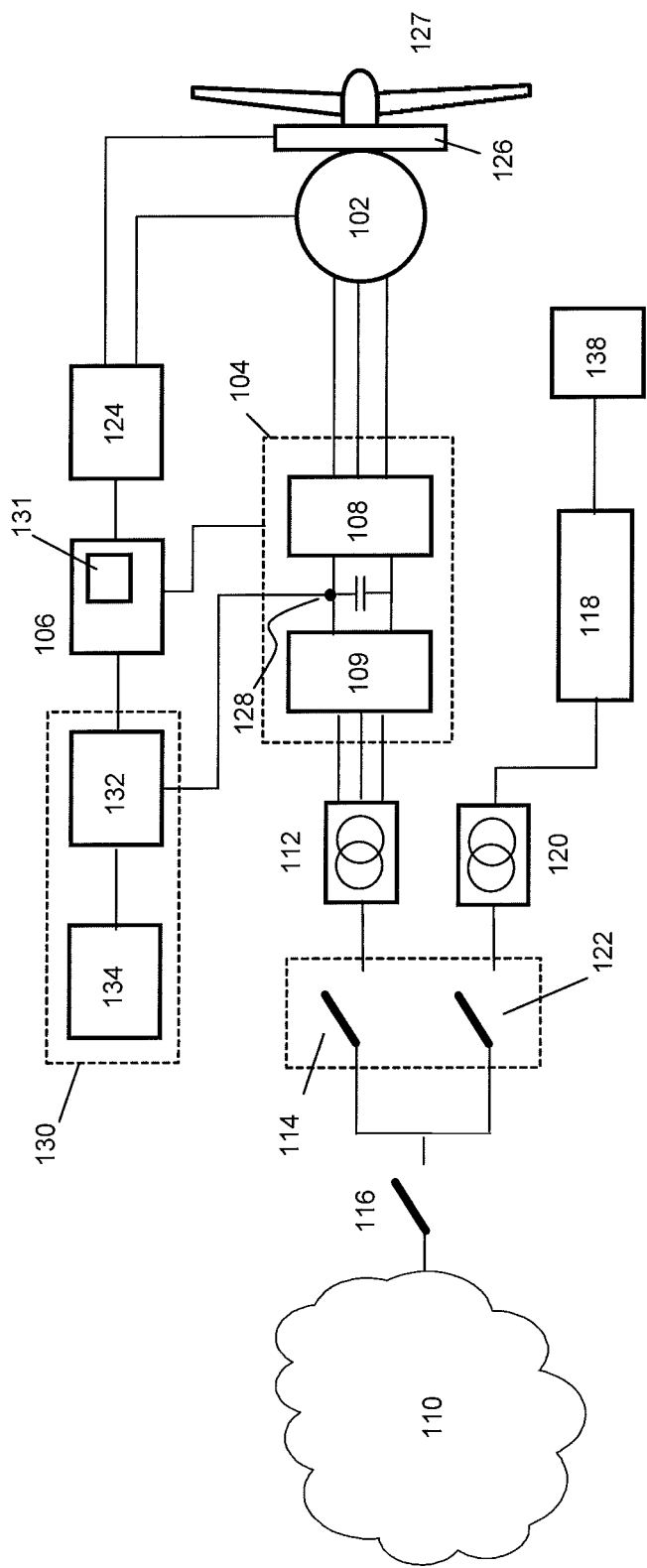
FIG. 1 depicts a wind turbine comprising a torque controller according to one embodiment of the invention.

FIG. 1 depicts a wind turbine 100 according to an embodiment of the invention. The wind turbine may comprise a generator 102, e.g. a permanent magnet (PM) generator or a synchronous or asynchronous type generator, which transforms the rotary energy of the blades into a variable ac electrical power.

The output of the generator is fed into a converter 104 controlled by a converter controller 106, wherein the converter may comprise an active generator-side inverter 108 for converting the ac power generated by the generator into DC power. The active generator-side inverter may be connected via a DC bus bar to an active grid-side inverter 109 for converting the DC power into an AC power of a frequency used by the public grid 110. The output of the convertor may be connected via one or more transformers 112 and one or more switches 114,116 to the grid.

The wind turbine further comprises a low power auxiliary power distribution system 118 connected via a transformer 120 and one or more switches 122 to the main grid. This auxiliary power supply may serve as a low power supply for the electrical components, e.g. cooling and control systems, in the wind turbine.

A wind turbine controller 124 may be configured to control the processes in a wind turbine. The controller may collect operational data (e.g. rotor speed, temperature, wind speed, conversion efficiency, etc.) and use these operational data to control other functional elements in the turbine. For example, it may control a blade pitch mechanism 126 for pitching the blades 127 towards a working position or towards a vane position as a function of the measured operational data, such that an optimal steady-state operation of the wind turbine may be achieved. In particular, the wind turbine controller may measure the power at the inverter output, and rotor speed and—in response—to pitch the blades in a desired position such that a desired steady state output power is achieved.

Fluctuations (in particular a temporarily decrease in the grid voltage referred to as a low voltage ride through) in the grid-voltage at the AC side of the grid-site inverter may cause voltage fluctuations (in particular an excess voltage) at the DC voltage node 128. The blade pitch mechanism however is not suitable for compensating this excess voltage, as the pitch mechanism has a relatively slow response time (e.g. 0.5-5 seconds). Hence, if the unbalance due to the excess voltage is not sufficiently fast compensated, such excess voltage may cause damage to the inverter. For similar reasons, the blade pitch mechanism is not suitable for establishing an emergency stop wherein the torque of the wind turbine should be reduced to zero, or at least a low value, within milliseconds.

To counter this problem, a fast-response fault protection system 130 associated with the converter controller is configured to decrease the wind turbine torque in a controlled way while keeping the voltage at the DC voltage node below a certain maximum. If the converter controller senses a fault signal, e.g. due to a grid fault or an emergency stop, the converter controller may override the torque setpoint of the torque controller 131.

The torque controller may be implemented as be part of the converter controller or alternatively as a separate functional element connected to the converter controller or converter. Further, the torque controller may be implemented a software program configured to execute code portions stored in a storage medium, as one or more hardware elements or a combination thereof.

In one embodiment, the torque controller may control the torque of the turbine using a known direct torque control (DTC) method. This method may comprise the steps of: estimating the flux linkage associated with the wind turbine generator (e.g. by integrating the stator voltages); and, estimating the actual torque of the turbine by determining a cross product of estimated stator flux linkage vector and the measured motor current vector. The thus determined flux magnitude and torque values are then compared with predetermined reference values. In one embodiment these reference values may be stored in look-up table (LUT), e.g. a memory, associated with the torque controller. In another embodiment, these reference values may be calculated on the basis of predetermined wind turbine parameters.

If either the determined flux or torque values deviate from the reference values for more than an allowed tolerance, the torque controller will react such that the flux and torque will return in their tolerance bands as fast as possible. The DTC method provides the advantage that the torque may be changed very fast. Such fast response may be required when controlling the torque down if a fault signal is detected.

If the converter controller senses a fault signal, the converter controller may further activate fault protection circuit. The fault protection circuit is connected to the DC voltage node and allows excess voltage to be compensated using a compensation systems such as a DC/DC brake chopper 132 connected to one or more resistor banks 134.

The converter controller may be configured for monitoring the DC voltage node and to activate the chopper when the voltage at the DC voltage node is higher than a certain maximum threshold voltage $V_T$.

Hence, when the voltage at the DC voltage node builds up due to a grid fault or an emergency stop, the chopper may temporarily open the path to the resistor banks so that part of the excess power may be dissipated. This process is repeated until a desired voltage at the DC voltage node is reached. The converter controller is configured to follow a predetermined torque ramp down such that the torque of the generator is gently decreased to a desired value. The advantages of this torque ramp down scheme will be described in more detail with reference to FIGS. 2 and 3.

Figure 2:
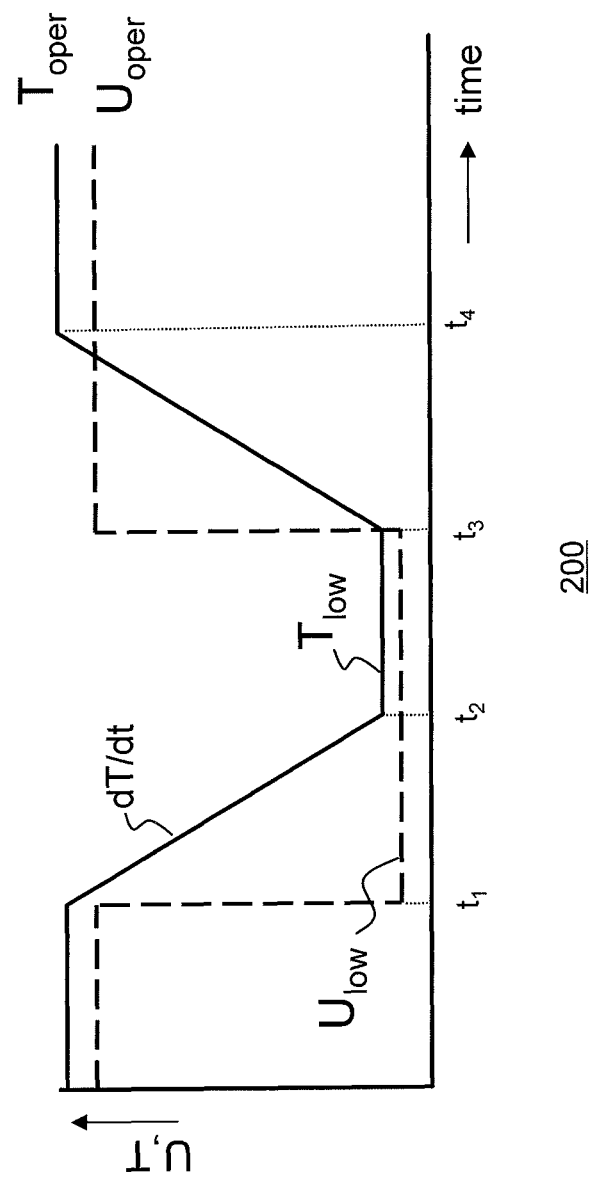
FIG. 2 depicts a torque response according to one embodiment of the invention.

FIG. 2 depicts an exemplary graph of a torque response according to one embodiment of the invention. In this particular embodiment, a fault may occur as a temporarily period of low voltage $U_{low}$ at the output of the converter (denoted in FIG. 2 by the dashed line), which is connected to the public grid. Such low voltage period may last up to 2 seconds wherein the voltage drops to values of 20-30% of the normal operation value $U_{oper}$. In such period of low grid voltage, an excess voltage may build up at the DC voltage node of the inverter as described with reference to FIG. 1.

After the occurrence of a fault ($t_1$ in FIG. 2), the converter controller may sense a DC voltage increase and—in response—trigger the brake chopper. Upon activation, the converter controller may signal the wind turbine controller to set the blades out of the wind in a vane position. Moreover, the converter controller may trigger the torque controller to decrease the turbine torque within a predetermined period of time to a desired value such that mechanical stresses during the torque ramp down are minimized. Preferably, the torque controller may be configured to generate a torque response wherein the torque is ramped-down from its normal operation torque value $T_{oper}$ to a desired low torque value $T_{low}$ within a time period between 0.01 and 10 seconds, preferably between 0.5 and 1.5 seconds. In one embodiment, the low torque value is approximately between 0 and 50%, preferably between 10% and 50%, of the normal operation torque value which may be used during steady-state operation of the wind turbine.

The torque controller may use the direct torque control (DTC) method or another known torque control method to achieve the desired decrease in the torque. In that case, the torque controller uses calculated or preconfigured torque reference values, which follow a desired torque response dT/dt as depicted in FIG. 2. The desired torque response is determined such that the mechanical stress during the low-voltage fault is minimal.

During the remainder of the low-voltage fault, the torque controller may keep the turbine torque at a suitable low torque value until the end of the grid fault is detected (t3 in FIG. 2). In that case, the converter controller may signal the wind turbine controller to controllably pitch the blades into the wind. Moreover, the converter controller may signal the torque controller to controllably increase the torque to a desired normal operation torque value $T_{oper}$ (t4 in FIG. 2). Preferably, the torque controller may be configured to generate a torque response wherein the torque is ramped-up from the low torque value $T_{low}$ to a desired normal operation value $T_{oper}$ within a time period between 0.01 and 10 seconds, preferably between 0.5 and 1.5 seconds such that mechanical stresses and mechanical oscillations during the torque ramp-up is minimized.

Figure 3:
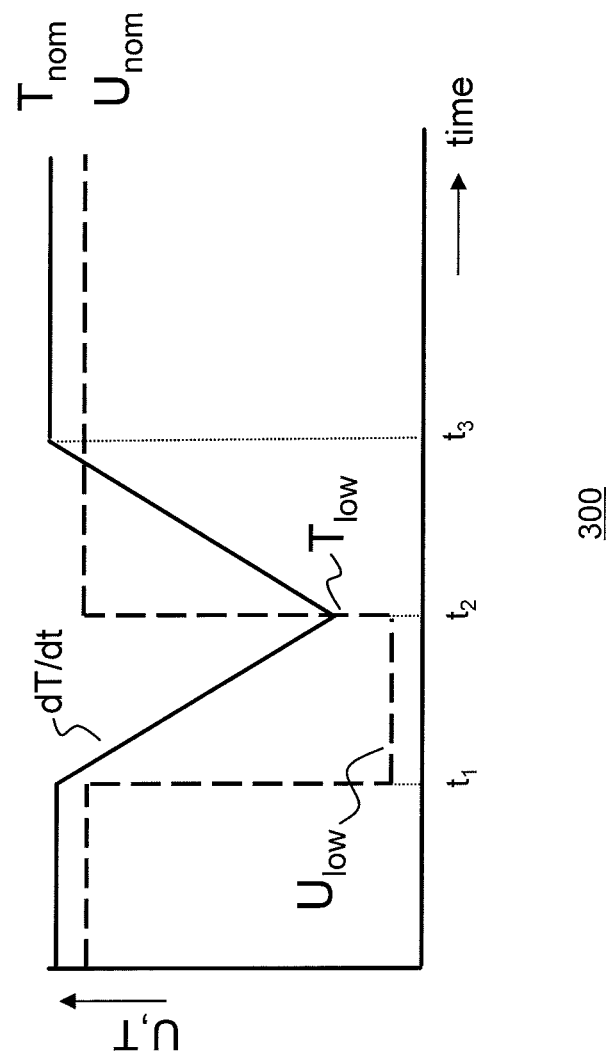
FIG. 3 depicts a torque response according to another embodiment of the invention.

FIG. 3 depicts an exemplary torque response according to another embodiment of the invention. In this case, the low voltage period is shorter than the one depicted in FIG. 2 such that the end of the grid fault ($t_2$ in FIG. 3) is detected during a torque ramp-down. Hence, in that case—when the end of the low voltage period is detected—the ramp-down process is stopped and a ramp-up process as described with reference to FIG. 2 is initiated in order to ramp up the torque to a desired normal operation torque value $T_{oper}$ (t3 in FIG. 3) such that mechanical stresses and mechanical oscillations during the torque ramp up is minimized.

In the torque ramp down schemes described above, it is assumed that the fault period is short enough to enable continuation of normal wind turbine operation after the fault. If however the fault period is too long, the inverter may signal the wind turbine controller to set the wind turbine in a "stand-by" (park) position. In that case the wind turbine controller 124 in FIG. 1 may, in one embodiment, disconnect—as a protective measure—the wind turbine from grid. Such disconnection may be achieved by opening a main switch 116, and, optionally, some further switches 116,122 (e.g. secondary switches for providing further electrical isolation of the wind turbine from the grid). When the wind turbine is disconnected, the wind turbine controller may set the wind turbine in a standby mode by stopping the rotation of the turbine by pitching the wind blades in the vane position.

When isolating the wind turbine from the grid, the low power auxiliary power distribution system 118 (which provides a low power supply for the electrical components in the wind turbine) may be powered by an uninterruptable power supply (UPS) 138. This way continuous standby operation of the wind turbine is ensured. Typically the UPS comprises a system of batteries, super capacitors and/or a diesel generator set installed in or near the wind turbine.

It is noted that although the torque response in FIGS. 2 and 3 are depicted as linear responses, the invention may also include responses wherein part of the (ramp-down and/or ramp-up) response is non-linear, e.g. curved, in order to provide smooth response with minimal mechanical stress exposure to the wind turbine structure.

Figure 4:
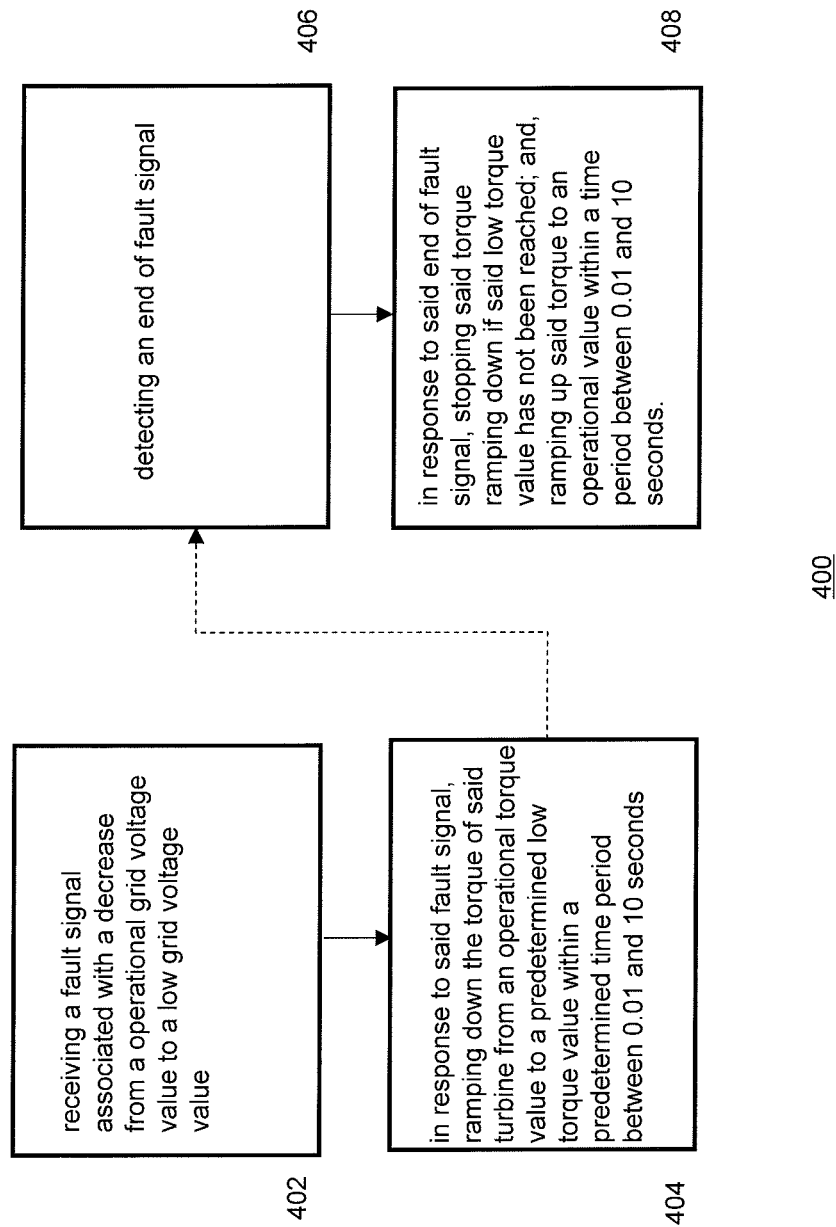
FIG. 4 depicts a flow diagram for controlling the torque of a wind turbine generator according to one embodiment of the invention.

FIG. 4 depicts a flow diagram 400 of a process for controlling the torque of a wind turbine generator according to one embodiment of the invention. This process may start with a converter controller detecting a fault (a low voltage ride through) (step 402). In response, the converter controller may controllably ramp down the torque of the wind turbine from the normal operation torque value to a desired low torque value within a time period between 0.01 and 10 seconds, preferably between 0.5 and 1.5 seconds (step 404). In one embodiment, the direct torque control (DTC) method may be used to control the turbine torque. In this method, the flux linkage associated with the wind turbine generator is estimated by integrating the stator voltages so that the torque may be estimated as a cross product of estimated stator flux linkage vector and measured motor current vector. The estimated flux magnitude and torque are then compared with predetermined reference values.

By controllably ramping down the torque in accordance with a desired reference torque response, the mechanical stress on the wind turbine structure may be minimized. Thereafter, the controller may keep the torque at the low torque value until the end of the fault is detected (step 406). If the end of the fault is detected, the converter controller may controllably ramp-up the torque of the wind turbine to a normal operation torque value. Preferably, the ramp up process is completed within a time period between 0.01 and 10 seconds, preferably between 0.5 and 1.5 seconds (step 408).

Figure 5:
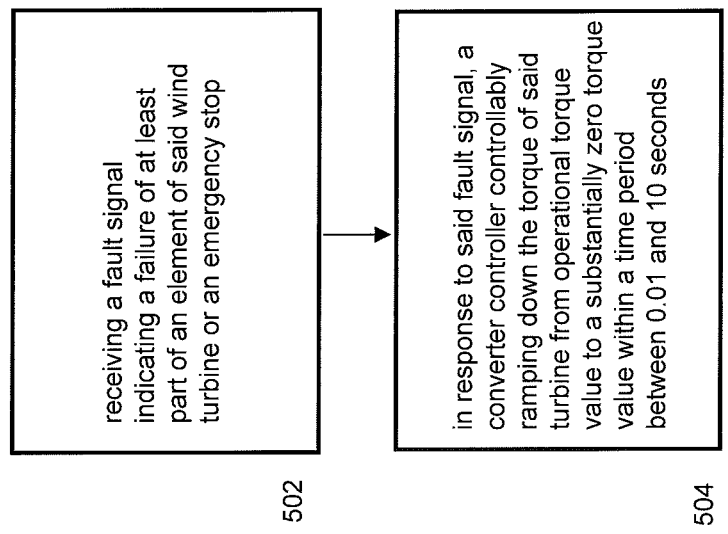
FIG. 5 depicts a flow diagram for controlling the torque of a wind turbine generator according to another embodiment of the invention.

FIG. 5 depicts a flow diagram 500 of a process for controlling the torque of a wind turbine generator according to another embodiment of the invention. In this case, the process may start with the wind turbine controller detecting an fault signal (step 502), e.g. a signal associated with a pitch defect or the like or a person pressing the emergency stop. In that case—in response—, the wind turbine controller may rotate the blades into a vane position (step 504) and initiate an emergency stop process using a torque control scheme wherein the torque of the turbine is reduced from a normal operation torque value to zero (or at least a predetermined low torque value) within a time period between 0.01 and 10 seconds, preferably between 0.5 and 1.5 seconds thereby minimizing mechanical stress on the wind turbine structure.

It is to be understood that any feature described in relation to any one embodiment may be used alone, or in combination with other features described, and may also be used in combination with one or more features of any other of the embodiments, or any combination of any other of the embodiments. Further equivalents and modifications not described above may also be employed without departing from the scope of the invention, which is defined in the accompanying claims. For example, instead of using a torque controller configured as an electrically/magnetically-controlled power take off (PTO) (as used with the direct torque control (DTC) method), other PTO systems, e.g. mechanically or hydraulically controlled PTO's may be used without departing from the invention.

The invention claimed is:

1. A method for controlling the torque of a wind turbine generator, comprising:
   receiving a fault signal; and,
   in response to said fault signal, controllably ramping down the torque of said generator from a first torque value to a predetermined second torque value within a predetermined time period between 0.01 and 10 seconds, wherein said first torque value represents a normal operation torque value and wherein said predetermined second torque value represents a low torque value which is between 10 and 50% of said normal operation torque value.

2. The method according to claim 1 wherein the torque of said generator is ramped down on the basis of one or more reference torque values.

3. The method according to claim 2, wherein said torque ramping down further comprises:
   determining an actual torque value of said generator;
   comparing said actual torque value with at least one of said reference torque values;
   if said actual torque value deviates from said at least one of said reference torque values, controlling said actual torque value to said at least one of said reference torque values.

4. The method according claim 1 further comprising:
   during said torque ramp down releasing at least part of the power stored in a converter connected to the generator to one or more brake resistors.

5. The method according to claim 1, comprising:
   detecting an end of fault signal;
   in response to said end of fault signal, stopping said torque ramping down if said second torque value has not been reached; and, ramping up said torque to said first torque value.

6. The method according to claim 1, wherein said fault signal is generated by a converter controller in response to the detection of a grid fault comprising a decrease from a nominal grid voltage value to a low grid voltage value or wherein said fault signal is generated by a wind turbine controller in response of the detection of a failure of at least part of an element of said wind turbine generator or an emergency stop.

7. A torque controller for controlling the torque in a wind turbine generator wherein said torque controller is configured to:
   receive a fault signal; and,
   in response to said fault signal, to controllably ramp-down the torque of said generator from a first torque value to a predetermined second torque value within a predetermined time period between 0.01 and 10 seconds, wherein said first torque value represents a normal operation torque value and wherein said second predetermined torque value represents a low torque value which is between 10 and 50% of said normal operation torque value.

8. The torque controller according to claim 7 wherein the torque of said generator is ramped down on the basis of one or more reference torque values.

9. The torque controller according to claim 7, wherein said torque controller is further configured to:
   detect an end of fault signal;
   in response to said end of fault signal, to stop said torque ramping down if said second torque value has not been reached; and,
   to ramp-up said torque to said first torque value.

10. A wind turbine comprising:
    a generator;
    a converter connected to the generator;
    a torque controller operably connected to the generator, wherein said torque controller is configured to:
    receive a fault signal; and,
    in response to said fault signal, to controllably ramp-down the torque of said generator from a first torque value to a predetermined second torque value within a predetermined time period between 0.01 and 10 seconds, wherein said first torque value represents a normal operation torque value and wherein said second predetermined torque value represents a low torque value which is between 10 and 50% of said normal operation torque value.

11. The wind turbine according to claim 10, further comprising a brake chopper connected to the converter and configured to release at least part of the power stored in the converter to one or more brake resistors.

12. A non-transitory, computer readable medium, having instructions that when executed by a computer, perform a method for controlling torque of a wind turbine generator, the method comprising:
    receiving a fault signal; and,
    in response to said fault signal, controllably ramping down the torque of said generator from a first torque value to a predetermined second torque value within a predetermined time period between 0.01 and 10 seconds, wherein said first torque value represents a normal operation torque value and wherein said second torque value represents a low torque value which is between 10 and 50% of said normal operation torque value.

13. The torque controller according to claim 7 wherein said second torque value represents a low torque value which is between 20% and 40% of said normal operation torque value.

14. The method according to claim 1, wherein said second torque value represents a low torque value which is between 20% and 40% of said normal operation torque value.

15. The method according to claim 1 wherein the time period associated with said torque ramping down and torque ramping up is selected from a time value between 0.1 and 1.5 seconds.

16. The torque controller according to claim 7, wherein the time period associated with said torque ramping down and torque ramping up is selected from a time value between 0.1 and 1.5 seconds.

17. The torque controller according to claim 7, wherein said torque controller is configured to:
- determine an actual torque value of said generator;
- comparing said actual torque value with at least one of said reference torque values; and
- if said actual torque value deviates from said reference torque value, control said actual torque value to said reference torque value.

* * * * *